(12) United States Patent
Babin

(10) Patent No.: US 7,192,270 B2
(45) Date of Patent: *Mar. 20, 2007

(54) TIGHT PITCH NOZZLE WITH INDIVIDUAL VALVE GATE CONTROL

(75) Inventor: Denis Babin, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 183 days.

This patent is subject to a terminal disclaimer.

(21) Appl. No.: 10/700,521

(22) Filed: Nov. 5, 2003

(65) Prior Publication Data

US 2004/0091569 A1  May 13, 2004

Related U.S. Application Data

(60) Provisional application No. 60/423,585, filed on Nov. 5, 2002.

(51) Int. Cl.
*B29C 45/22* (2006.01)

(52) U.S. Cl. .............. 425/572; 425/130; 425/564; 425/573

(58) Field of Classification Search ............. 425/130, 425/572, 573, 564
See application file for complete search history.

(56) References Cited

U.S. PATENT DOCUMENTS

| | | | | |
|---|---|---|---|---|
| 2,418,856 A | * | 4/1947 | Stacy | 264/328.8 |
| 3,947,175 A | * | 3/1976 | Melcher | 425/130 |
| 3,947,177 A | | 3/1976 | Eckardt | 425/130 |
| 4,279,582 A | | 7/1981 | Osuna-Diaz | 425/59 |
| 4,380,426 A | | 4/1983 | Wiles | 425/566 |
| 4,657,496 A | | 4/1987 | Ozeki et al. | 425/130 |
| 4,803,031 A | | 2/1989 | Ochs et al. | 264/255 |
| 5,078,589 A | * | 1/1992 | Osuna-Diaz | 425/562 |
| 5,223,275 A | * | 6/1993 | Gellert | 425/130 |
| 5,238,378 A | | 8/1993 | Gellert | 425/130 |
| 5,368,470 A | * | 11/1994 | Manner | 425/564 |
| 5,372,496 A | * | 12/1994 | Taniyama | 425/556 |
| 5,375,994 A | | 12/1994 | Friderich et al. | 425/562 |

(Continued)

FOREIGN PATENT DOCUMENTS

DE  32 45 571 A1  6/1984

(Continued)

OTHER PUBLICATIONS

International Search Report EP 03025448.6 dated Mar. 1, 2004.

(Continued)

*Primary Examiner*—Joseph S. Del Sole
*Assistant Examiner*—Emmanuel S. Luk
(74) *Attorney, Agent, or Firm*—Medler Ferro PLLC (57) ABSTRACT

An injection molding system is disclosed. The system includes a multiple valve gated nozzle. The flow through each valve gate is determined by individually operated valve pins. Each valve pin is independently controlled by a separate actuation unit. In order to achieve a tight pitch between the valve pins, the actuation units are placed in a stacked configuration, with the valve pin controlled by the upper actuation unit passing through the lower actuation unit. The valve pin of the lower actuation unit is offset from a center of the upper actuation unit to allow for the unimpeded passage of the valve pin from the upper actuation unit through the lower actuation unit.

13 Claims, 6 Drawing Sheets

U.S. PATENT DOCUMENTS

| | | | | |
|---|---|---|---|---|
| 5,423,672 A | 6/1995 | Gordon | | 425/564 |
| 5,660,369 A | 8/1997 | Gauler | | 251/63.5 |
| 5,695,793 A | 12/1997 | Bauer | | 425/564 |
| 5,891,381 A * | 4/1999 | Bemis et al. | | 264/328.8 |
| 5,935,621 A | 8/1999 | Gellert et al. | | 425/549 |
| 6,162,044 A | 12/2000 | Babin | | 425/562 |
| 6,276,914 B1 | 8/2001 | Sicilia | | 425/131.5 |
| 6,332,767 B1 | 12/2001 | Kudert et al. | | |
| 2004/0109916 A1* | 6/2004 | Babin | | 425/572 |

FOREIGN PATENT DOCUMENTS

| | | |
|---|---|---|
| DE | 37 33 363 A1 | 4/1989 |
| EP | 0 936 048 A1 | 8/1999 |
| JP | 6-170888 A | 8/1994 |
| JP | 2000-25072 A | 1/2000 |
| JP | 2000-033634 A | 2/2000 |
| JP | 2001-105458 A | 4/2001 |
| JP | 2002-36310 A | 2/2002 |

OTHER PUBLICATIONS

Patent Application entitled "Valve Gate Actuation Method and Apparatus", Baumann et al., date unknown.

HEITEC catalog, 2 pages, date unknown, published prior to Nov. 22, 2002.

Husky catalog, 1 page, date unknown, published prior to Nov. 22, 2002.

* cited by examiner

TIGHT PITCH NOZZLE WITH INDIVIDUAL VALVE GATE CONTROL

BACKGROUND OF THE INVENTION

1. Field of the Invention

This invention relates generally to injection molding and, more particularly, to a valve gated hot runner injection molding apparatus for tight pitch, single- or multi-material applications.

2. Background of the Invention

A valve gated injection molding apparatus is well known, as shown and described in U.S. Pat. No. 4,380,426 incorporated herein in its entirety by reference thereto. Usually a valve pin has a cylindrical or tapered front end and reciprocates between a retracted open position and a forward closed position in which the front end is seated in a gate. In some applications, the valve pin functions in the reverse direction and closes in the retracted position.

A valve gated injection molding apparatus for coinjecting and/or sequentially injecting two different materials through a single gate with multiple valve pins into a mold cavity is also well known, as shown and described in U.S. Pat. No. 5,238,378 incorporated herein in its entirety by reference thereto. For a greater level of control over the gating process, each individual valve pin may be independently controlled by separate actuation units.

Also well-known in the art is a multi-cavity valve gated injection molding apparatus having a plurality of nozzles, wherein each nozzle body is provided with a plurality of equally spaced valve pin bores with a corresponding plurality of valve pins. Such an apparatus in shown and described in U.S. Pat. No. 6,162,044 incorporated herein in its entirety by reference thereto. Each nozzle of the apparatus includes multiple valve pins, but all of the valve pins are controlled by a single actuation unit.

SUMMARY OF THE INVENTION

Accordingly, the present invention provides an injection molding system having a single or a plurality of nozzles that include valve gate technology. Each nozzle body is provided with at least two flow channels. In some circumstances one of the flow channel is a dominant flow channel and the other is a secondary flow channel. Each flow channel is fitted with a gating element, such as a valve pin, and each valve pin is independently moved and controlled using an actuation unit, such as a fluid or gas piston. Other actuation means of the valve gating means, such as electrical or mechanical are contemplated in the current invention. Each actuation unit is located for example linearly above its respective flow channel or in some instances in a lateral position with respect to the nozzle.

According to one aspect of this invention a primary actuation unit that controls a melt in the dominant flow channel has its valve pin centered on a longitudinal central axis of the actuation system, which is laterally offset from a longitudinal center axis of the nozzle assembly. A secondary actuation unit is located offset from the primary actuation unit with its valve pin alignment offset from the longitudinal central axis of the actuation system. The secondary actuation unit is provided with an opening so that the valve pin of the primary actuation unit can pass through the lower piston arrangement. As a result of this arrangement, the pitch from center to center of each valve pin is minimized. As such, the mold gates facing the nozzle may be arranged in a closer configuration to feed one or several mold cavities.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention is now described with reference to the figures, where like reference numbers indicate identical or functionally similar elements.

Figure 1:
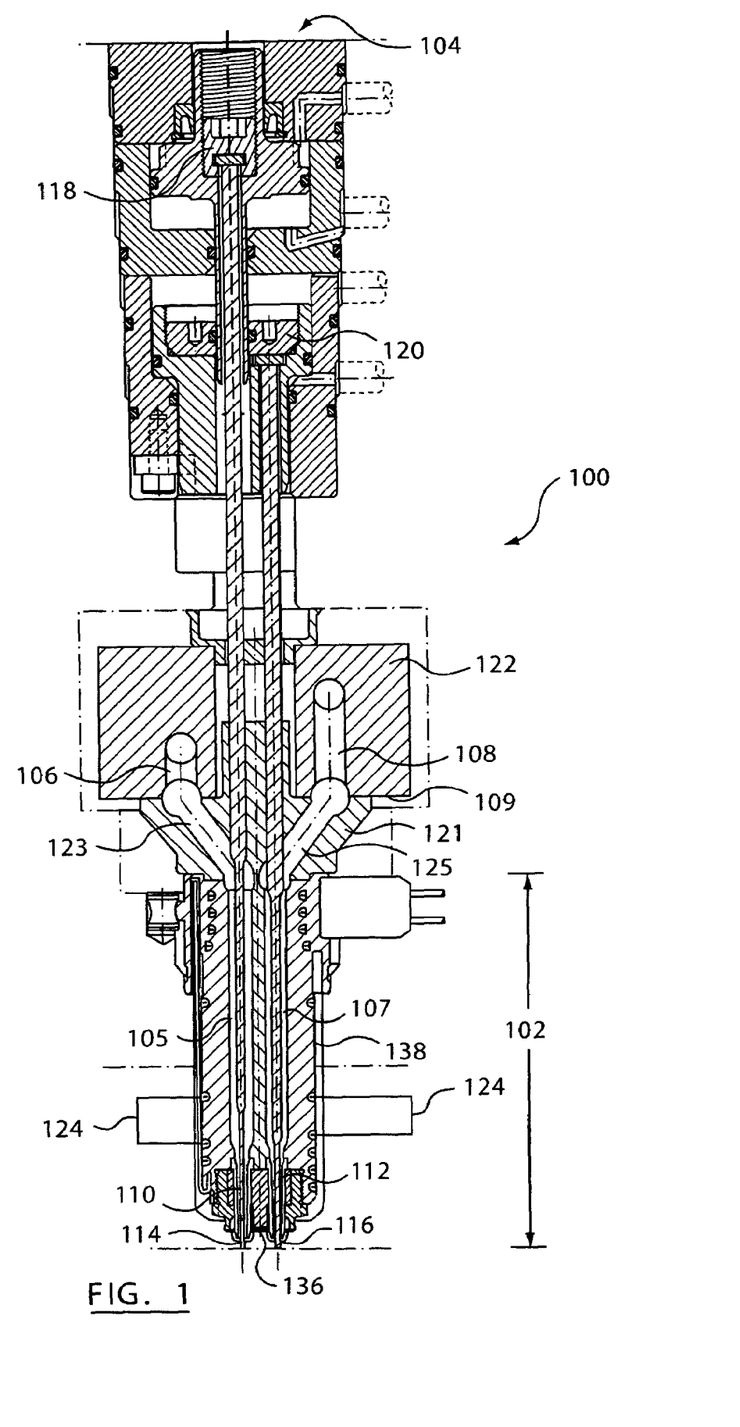
FIG. 1 is a sectional view of a dual valve gated injection nozzle with independent actuation of the valve gates in accordance with one aspect of the present invention.

Referring now to FIG. 1, a valve gated injection molding system 100 is shown. System 100 includes a nozzle assembly 102 and an actuation system 104. A longitudinal axis 136 of nozzle assembly 102 is shown for reference.

Nozzle assembly 102 functions, to a certain extent, similarly to known injection nozzles and includes a nozzle body 138. Melt is introduced into a first melt channel 105 and a second melt channel 107 of the nozzle body 138 via first and second manifold melt channels 106, 108 of a melt distribution manifold 122. The melt flowing through first melt channel 105 and first manifold melt channel 106 may be the same material as the melt flowing through second melt channel 107 and second manifold melt channel 108, or two different materials may be flowing through each set of channels. Also, the diameter of first melt and first manifold melt channels 105, 106 may be the same as the diameter of second melt and second manifold melt channels 107, 108, or the diameters of the two set of melt channels may be different. Such design considerations are heavily dependent upon the type of product to be produced by system 100 and/or the molding process being implemented.

As shown in FIG. 1, first manifold melt channel 106 is located closer to an outlet surface 109 of manifold 122 than second manifold melt channel 108. While not necessary for the operation of the present invention, offsetting the manifold melt channels 106, 108 allows for the later inclusion of additional melt channels or the modular addition of separate manifolds. Separate manifolds may be necessary if two different materials are used that have substantially different melt characteristics that require maintaining the melt at different temperatures.

Connecting manifold 122 to nozzle assembly 102 is a melt connector 121. Melt connector 121 includes a first connection melt channel 123 and a second connection melt channel 125. Melt connector 121 is a bushing used to connect manifold melt channels 106, 108 to nozzle melt channel 105, 107. Manifold melt channels 106, 108 are disposed in this embodiment towards the exterior perimeter of manifold 122. Nozzle melt channels 105, 107 are disposed closer to longitudinal axis 136 than manifold melt channels 106, 108. As such, first connection melt channel 123 is disposed diagonally through melt connector 121 so that first connection melt channel 123 fluidly connects first manifold melt channel 106 to first nozzle melt channel 105. Similarly, second connection melt channel 125 is disposed diagonally through melt connector 121 so that second connection melt channel 125 fluidly connects second manifold melt channel 108 to second nozzle melt channel 107.

Figure 1A:
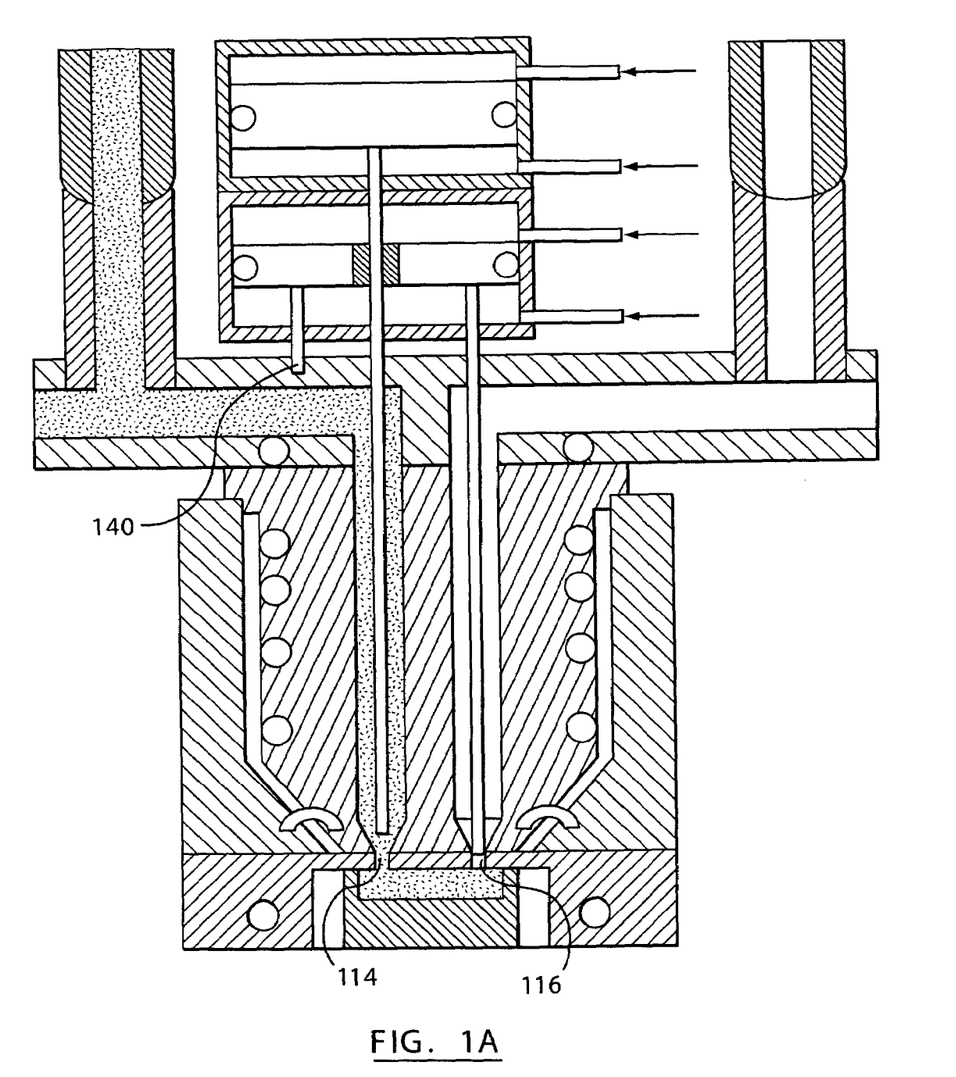
FIG. 1A is a sectional schematic of the injection nozzle of FIG. 1 showing the machine nozzles for the two materials.

As the melt flows through the first and second melt channels 105, 107 of the nozzle body 138, the temperature of the melt is maintained by heating element 124. Heating element 124 may be coiled, embedded, clamped, and/or cast to nozzle body 138. Further, heating element 124 may be comprised of a thin or thick film heating element. The melt flows through first and second valve gates 114, 116 into a mold cavity (not shown). The flow of the melt through each valve gate 114, 116 is independently controlled. First valve gate 114 is open when first valve pin 110 is not seated within first valve gate 114. Similarly, second valve gate 116 is open when second valve pin 112 is not seated within second valve gate 116. FIG. 1A shows first valve gate 114 in the open position and second valve gate 116 in the closed position.

The flow of the melt through first and second valve gates 114, 116 is controlled by actuation system 104. Actuation system 104 is located on the opposite side of the manifold 122 as the nozzle assembly 102. First and second valve pins 110, 112 extend through manifold 122 into actuation system 104.

Figure 2:
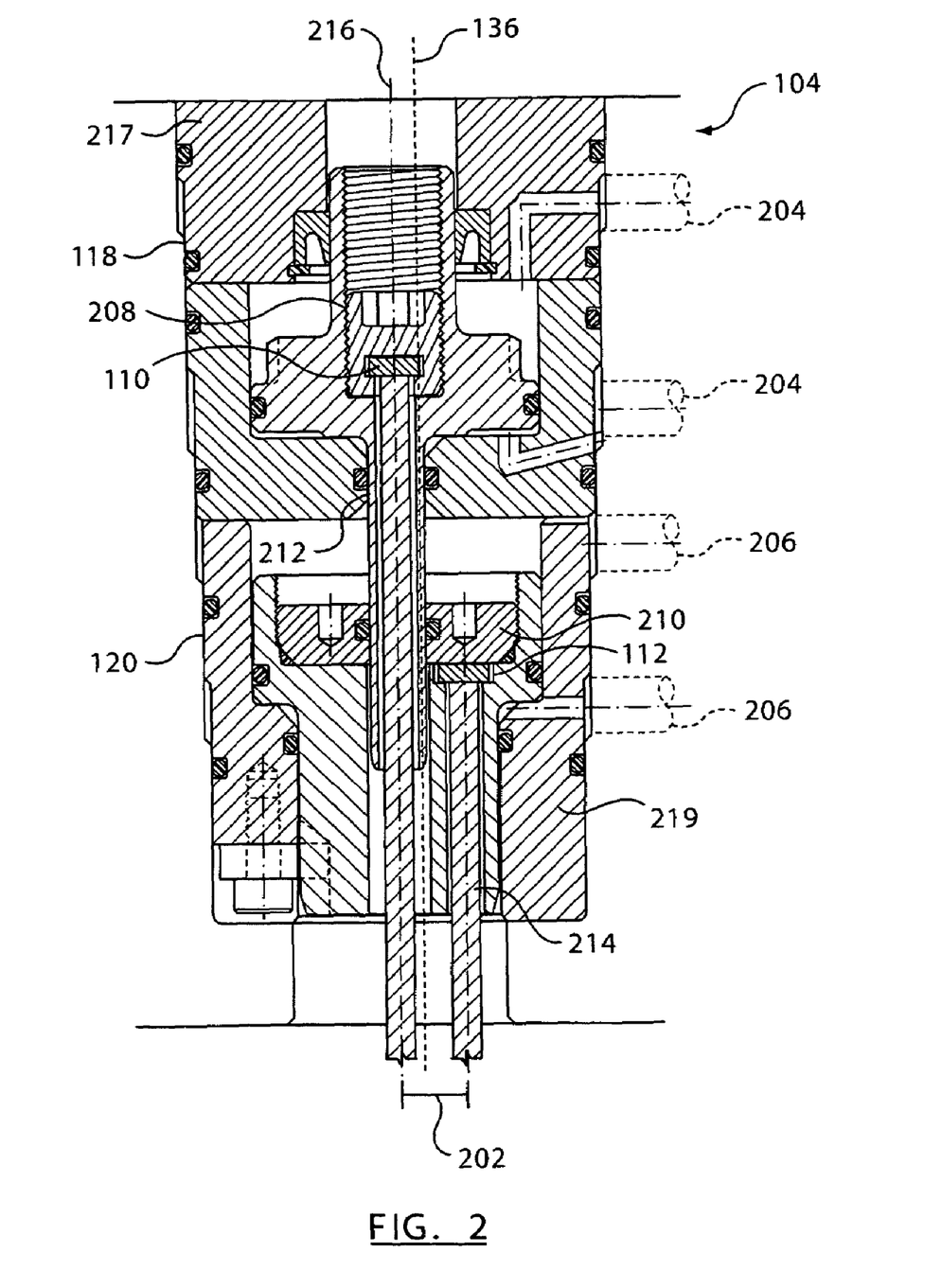
FIG. 2 is an enlarged sectional view of the actuation system of FIG. 1.

With reference now to FIG. 2, movement of the first valve pin 110 is controlled by a first actuation unit 118. First actuation unit 118 includes a first piston driving mechanism 204 and a first piston 208, which is slidable within a cylinder 217. First valve pin 110 is axially movable through a first valve pin channel 212. First valve pin channel 212 extends through a second actuation unit 120, manifold 122, and melt connector 121.

First piston driving mechanism 204 may be any of several mechanisms known in the art, for example, pneumatic or hydraulic systems, bladder pistons, or cam and lever systems. A pneumatic driving system operates by hooking an external air source to the piston driving mechanism with valves controlled by a timing circuit which applies and releases the pressure in a repetitive timed sequence in conjunction with the application of pressure to the melt from the molding system. A hydraulic driving system operates in the same manner as the pneumatic system, only hydraulic fluid is substituted for air.

In another embodiment, first piston driving mechanism 204 may be a bladder piston, as shown and described in the copending U.S. Appl. No. 60/363891 filed on Mar. 14, 2002 by the same assignee which is incorporated herein in its entirety by reference thereto. A bladder piston is an expandable and elongated bag which shortens in length when filled with a pressurized fluid like air, water or oil. One end of the bladder is affixed to a valve pin such that as the bladder is pressurized it contracts in length the valve pin is unseated from the valve gate allowing the melt to flow into the mold cavity. Similarly, depressurizing the bladder causes the bladder to increase in length, which seats the valve pin in the valve gate and stops the flow of the melt into the mold cavity.

As first piston driving mechanism 204 cycles through the sequence, first piston 208 is driven up and down. This causes first valve pin 110 to be driven downwards and upwards, thereby seating and unseating first valve pin 110 within first valve gate 114.

A longitudinal axis 216 of actuation system 104 is slightly offset from longitudinal axis 136 of nozzle assembly 102. However, first valve pin 110 of first actuation unit 118 is centered on longitudinal axis 216.

In order to minimize the space required to control movement of the valve pins 110, 112 independently, the second actuation unit 120 is disposed between first actuation unit 118 and manifold 122. Second actuation unit 120 includes a second piston driving mechanism 206 and a second piston 210, which is movable within a second cylinder 219. Second valve pin 112 is axially movable through a second valve pin channel 214. Second valve pin channel 214 extends through manifold 122 and melt connector 121.

First valve pin channel 212 passes through second actuation unit 120 to allow first valve pin 110 to reach nozzle assembly 102 unimpeded. A length of second valve pin 112 and second valve pin channel 214 are offset from longitudinal axis 216 in order to provide for the disposition of first valve pin channel 212 through second actuation unit 120. As shown in FIG. 1A, a rod 140 is disposed on second piston 210 in order to balance the operation of second piston 210 due to the offset positioning of second valve pin 112. Rod 140 may also be a dowel or other similar component.

Second piston driving mechanism 206 may be any of the various driving mechanisms as mentioned above with reference to first piston driving mechanism 204. As second piston driving mechanism 206 cycles through the sequence, second piston 210 is driven up and down. This causes second valve pin 112 to be driven downwards and upwards, thereby seating and unseating second valve pin 112 within second valve gate 116.

This arrangement of first and second actuation units 118, 120 permits the minimization of a pitch 202 between the longitudinal center axis of first valve pin 110 and second valve pin 112. Pitch 202 may be as small as less than 7 mm. This tight pitch configuration of the valve pins 110, 112 makes possible the close setting of valve gates 114, 116 of nozzle assembly 102 while maintaining independent actuation of valve gates 114, 116.

If a greater number of valve gates are desired with independent control from first and second valve gates 114, 116, additional actuation units can be stacked upon the existing actuation units. Additional offset valve pin channels would be provided through first and second actuation units 118, 120. Rod 140 could be eliminated as the additional valve pins would provide the necessary balancing of the piston action.

Figures 3A, 3B:
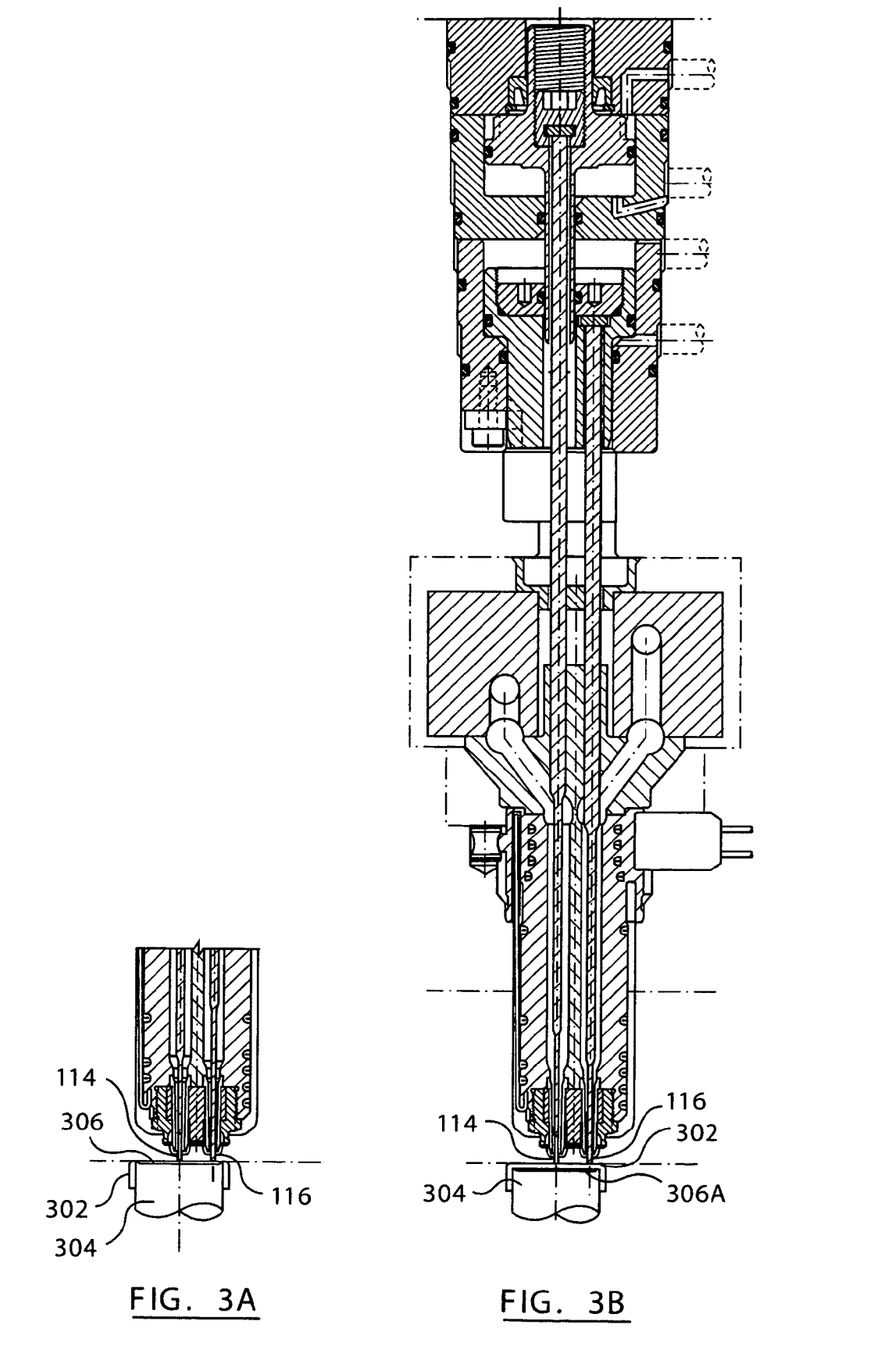
FIG. 3A shows a first step of the operation of the system of FIG. 1.
FIG. 3B shows a second step of the operation of the system of FIG. 1.

A bladder piston actuation unit may be employed for each valve pin of a multiple valve pin arrangement which may or may not require stacking or a lateral offset of each actuation unit FIGS. 3A and 3B show one possible application of a tight pitch dual valve gate configuration, the overmolding of a small part. A mold cavity 302 is shaped to mold a dual material small part, such as a cap. A mold core 304 is disposed within mold cavity 302 in order to form a secondary mold cavity 306. Secondary mold cavity 306 is filled with a first material through second valve gate 116, which is in the open position. To prevent a second material from entering secondary mold cavity 306, first valve gate 114 is in the closed position.

FIG. 3B shows the second step of the overmolding process in which a mold core 304 has been moved axially away from the valve gates 114, 116. A second material is injected into mold cavity 302 through first valve gate 114, which is in an open configuration to permit the flow of the second material. Second valve gate 116 is in the closed configuration to prevent further injection of the first material in to mold cavity 302. The second material covers a first molded material piece 306a to form a single dual material cap.

Figure 4:
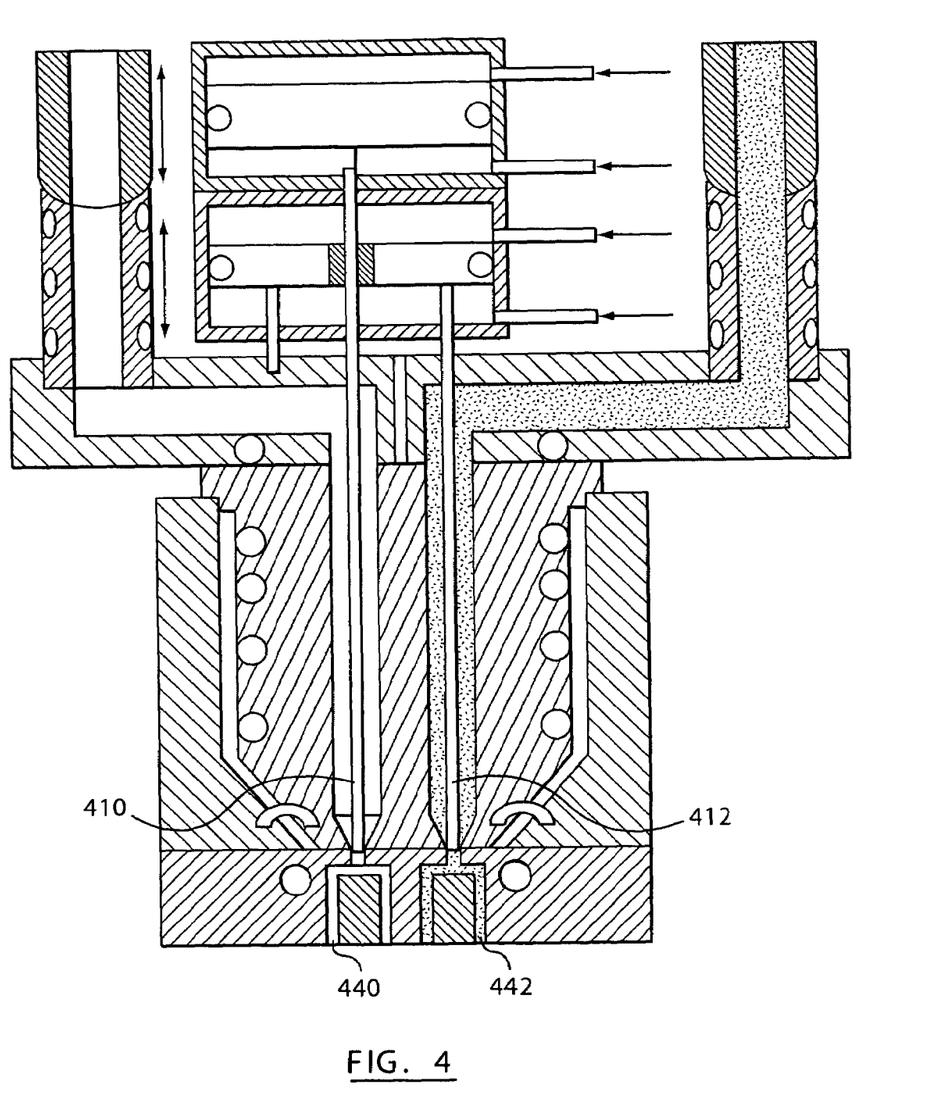
FIG. 4 shows a second application of the nozzle system of FIG. 1.

FIG. 4 shows another application of the present invention. The valve gated injection molding apparatus of the present invention is shown with a mold having two separate mold cavities 440, 442 of the same size and shape in close proximity. In this application, two similar articles of a different color or different material may be simultaneously molded. If for some reasons there is a need to mold more parts of one color than the other, the fact that two valve pins 410, 412 are independently movable allows one to inject only one kind of part for any number of cycles. Also of the two materials have different molding characteristics, such as the viscosity, the parts can be still molded by reciprocating valve pins 410, 412 at different times. Furthermore, one can either shuttle or rotate mold cavities 440, 442 to provide an overmolding solution where a second color/material is injected into each cavity.

Figure 5:
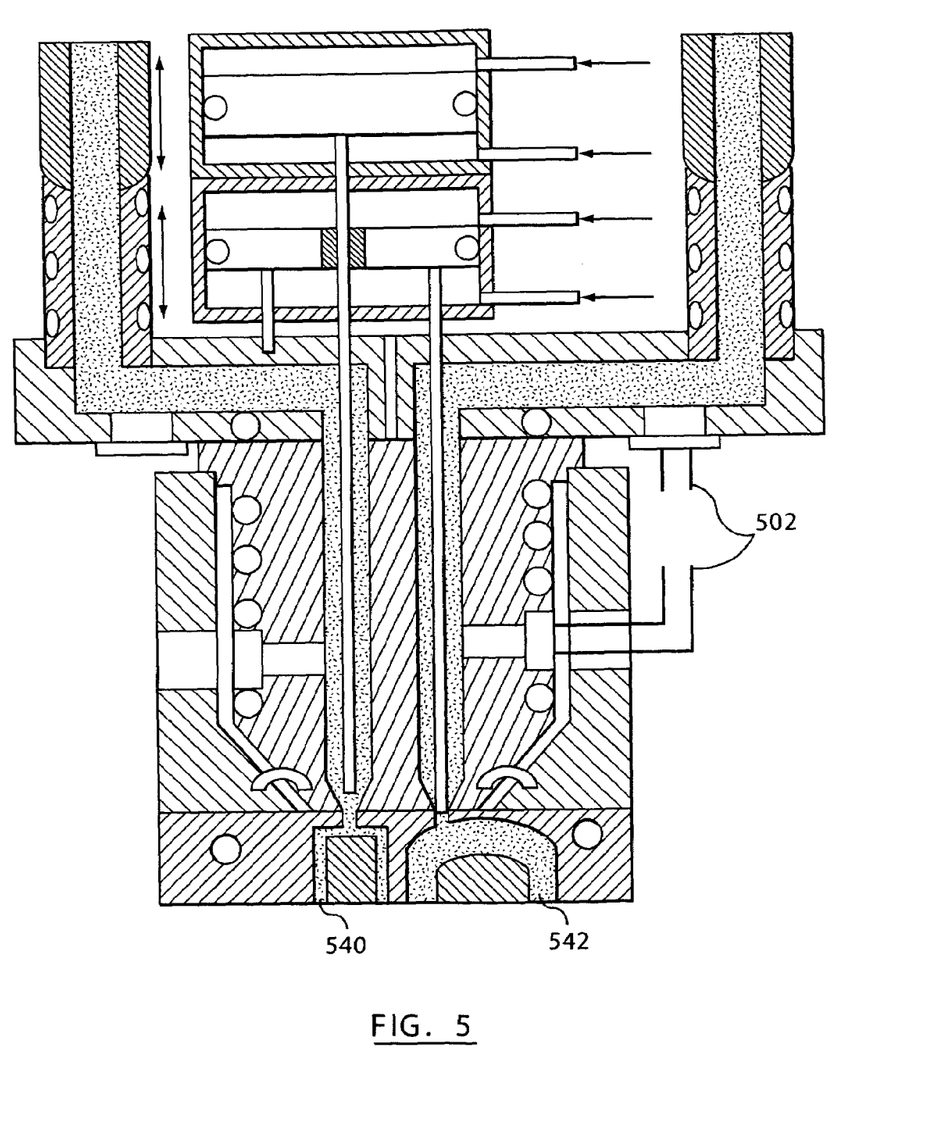
FIG. 5 shows a third application of the nozzle system of FIG. 1.

FIG. 5 shows another application of the present invention. The valve gated injection molding apparatus of the present invention is shown with a mold having two separate cavities 540, 542 of different size and shape in close proximity. In this application, two articles of the same or different color and/or same or different material may be simultaneously molded. Pressure sensors 502 are shown in the nozzle and or in the manifold that are used to control the movement of the valve pins in each melt channel, as well as the temperature of each nozzle based on the pressure readings.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An injection nozzle comprising:
    a nozzle body having a first melt channel and a second melt channel, the first melt channel being offset from the second melt channel;
    a first valve gating element for selectively opening a first gate;
    a second valve gating element for selectively opening a second gate;
    a first actuation mechanism coupled to the first valve gating element;
    a second actuation mechanism coupled to the second valve gating element, wherein the second actuation mechanism is located between the first actuation mechanism and the nozzle body; and
    means to drive independently said first and second actuation mechanisms to displace said first and second valve gating mechanisms relative to each other.

2. The injection nozzle according to claim 1, wherein the first gate links the first melt channel with a first mold cavity and the second gate links the second melt channel with a second mold cavity.

3. The injection nozzle according to claim 1, wherein the first gate links the first melt channel with a mold cavity and the second gate links the second melt channel to the same mold cavity.

4. The injection nozzle of claim 1, wherein the first valve gating element extends through the second actuation mechanism.

5. An injection molding apparatus comprising:
    a manifold having a first manifold melt channel for receiving a first melt stream of moldable material and a second manifold channel for receiving a second melt stream of moldable material;
    a nozzle having a first melt channel for receiving the first melt stream and a second melt channel for receiving a second melt stream, the first melt channel being axially offset from the second melt channel;
    a first valve gating element for selectively opening a first gate to allow the first melt stream to flow into a mold cavity; and
    a second valve gating element for selectively opening a second gate to allow the second melt stream to flow into the mold cavity, wherein the second valve gating element is operable independent of the first valve gating element;
    a melt channel connector provided between the manifold and the nozzle, the melt channel connector having a first connecting melt channel and a second connecting melt channel,
    wherein the first connecting melt channel is in fluid communication with the first manifold melt channel and the first nozzle melt channel, and the second connecting channel is in fluid communication with the second manifold melt channel and the second nozzle melt channel.

6. The injection molding apparatus according to claim 5, wherein the melt channel connector is a bushing for receiving the first valve gating element and the second valve gating element.

7. The injection molding apparatus according to claim 5, further comprising a first actuation mechanism coupled to a first valve gating element and a second actuation mechanism coupled to a second valve gating element.

8. The injection molding apparatus according to claim 7, wherein the second actuation mechanism is located between the first actuation mechanism and the nozzle.

9. The injection molding apparatus according to claim 8, wherein the first valve gating element extends through the second actuation mechanism.

10. The injection molding apparatus according to claim 8, further comprising a bushing surrounding the first valve gating element, the bushing being slidable through the second actuation mechanism.

11. The injection molding apparatus according to claim 8, wherein the first actuation mechanism includes a first piston coupled to the first valve gating element and the second actuation mechanism includes a second piston coupled to the second valve gating element.

12. The injection molding apparatus according to claim 11, wherein the first valve gating element is surrounded by a bushing, the bushing configured to be slidable through the second piston.

13. An injection nozzle comprising:
    a nozzle body having a first nozzle melt channel and a second nozzle melt channel;

a first valve gating element;
a second valve gating element;
a first actuation mechanism coupled to the first valve gating element;
a second actuation mechanism coupled to the second valve gating element, the second actuation mechanism positioned between the first actuation mechanism and the nozzle body and configured to allow the first valve gating element to pass therethrough unimpeded;
means to drive independently the first and second actuation mechanisms to displace the first and second valve gating mechanisms relative to each other.

* * * * *

UNITED STATES PATENT AND TRADEMARK OFFICE
CERTIFICATE OF CORRECTION

PATENT NO. : 7,192,270 B2 Page 1 of 1
APPLICATION NO. : 10/700521
DATED : March 20, 2007
INVENTOR(S) : Denis Babin It is certified that error appears in the above-identified patent and that said Letters Patent is hereby corrected as shown below:

Claim 5, line 7, delete "receiving a" and insert --receiving the-- therefor.

Signed and Sealed this

Fifth Day of June, 2007

JON W. DUDAS
*Director of the United States Patent and Trademark Office*